US006353736B1

(12) United States Patent
Hiromichi

(10) Patent No.: US 6,353,736 B1
(45) Date of Patent: Mar. 5, 2002

(54) INFORMATION COMMUNICATION TERMINAL WITH CHARGING MANAGEMENT FUNCTION

(75) Inventor: Ishida Hiromichi, Shizuoka (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/307,799

(22) Filed: May 10, 1999

(30) Foreign Application Priority Data

May 14, 1998 (JP) .......................................... 10-132180

(51) Int. Cl.[7] ................................................ H04Q 7/20

(52) U.S. Cl. ....................... 455/406; 455/422; 455/414; 455/406; 455/407; 455/408; 455/415

(58) Field of Search ................................ 455/406, 407, 455/408, 415, 418, 414; 340/7.55, 5.74, 5.42, 825.44; 379/114.05

(56) References Cited

U.S. PATENT DOCUMENTS 5,153,906 A * 10/1992 Akiyama .................... 379/112
5,465,288 A * 11/1995 Falvey et al. ................. 379/58
5,500,893 A * 3/1996 Onosaka ..................... 379/396
5,646,984 A * 7/1997 Oda ........................... 379/114
5,727,057 A * 3/1998 Emery et al. ............... 379/211
5,737,688 A * 4/1998 Sakai et al. ................ 455/31.2
5,802,502 A * 9/1998 Gell et al. .................. 379/114
5,991,379 A * 11/1999 Kusaki et al. .............. 379/115

FOREIGN PATENT DOCUMENTS

JP 5-176040 7/1993
JP 6-209276 7/1994

* cited by examiner

*Primary Examiner*—Daniel Hunter
*Assistant Examiner*—Yemane Woldetatios
(74) *Attorney, Agent, or Firm*—Whitham, Curtis & Christofferson, PC

(57) ABSTRACT

An information communication terminal with a charging management function includes a storage section, a message creation section, a pager call number adding section, an output section, and a management section. The storage section receives and stores an incoming message of a radio signal transmitted from a base station. The message creation section edits the contents of the stored incoming message or creates a new message. The pager call number adding section adds the pager call number of the destination to message information edited or created by the message creation section. The output section outputs the message information and the pager call number of the destination as information data through a push-phone. The management section supervises the destination of the information data and performs charging management.

7 Claims, 11 Drawing Sheets

FIG.5

| TELEPHONE DIRECTORY: NAME | TELEPHONE DIRECTORY: TELEPHON NUMBER | CHARGING TARGET:YES/NO | CHARGE CALCULATION SELECTION: A | CHARGE CALCULATION SELECTION: B | | CHARGE CALCULATION SELECTION: INDIVIDUAL SETTING (YEN) | | CALL CHARGE (YEN) PER CALL |
|---|---|---|---|---|---|---|---|---|
| | | CURRENT AREA:NAGOYA(CONTRACT WITH VENDOR C) | | | | | | |
| SATO XX | 03-XXXX-XXXX | YES | ○(TOKYO) | - | | - | = | 30 |
| TANAKA XX | 011-XXX-XXXX | NO | - | - | | - | | - |
| SUZUKI XX | 045-XXX-XXXX | YES | - | ○ | VENDOR C | - | = | 10 |
| MATUMURA XX | 075-XXX-XXXX | YES | - | - | | 15 | = | 15 |
| TAKAHASHI XX | 06-XXXX-XXXX | YES | ○(OSAKA) | ○ | VENDOR E | - | = | 60 |
| INOUE XX | 092-XXX-XXXX | YES | ○(HUKUOKA) | - | | 20 | = | 70 |
| WATANABE XX | 022-XXX-XXXX | YES | - | ○ | VENDOR G | 10 | = | 30 |
| YAMADA XX | 082-XXX-XXXX | YES | ○(HIROSHIMA) | ○ | VENDOR A | 20 | = | 85 |

FIG.6

[TABLE A :DISTANCE-BASED CHARGE TABLE]

(UNIT:YEN)

| ORIGINATING AREA= CURRENT AREA | | SAPPORO | SENDAI | TOKYO | YOKOHAMA | NAGOYA | OSAKA | KYOTO | ··· | HIROSHIMA | FUKUOKA |
|---|---|---|---|---|---|---|---|---|---|---|---|
| TERMINATING AREA | AREA CODE | 011 | 022 | 03 | 045 | 052 | 06 | 075 | ··· | 082 | 092 |
| SAPPORO | 011 | 10 | 20 | 30 | 40 | 50 | 60 | 70 | ··· | 80 | 90 |
| SENDAI | 022 | 20 | 10 | 20 | 30 | 40 | 50 | 60 | ··· | 70 | 80 |
| TOKYO | 03 | 30 | 20 | 10 | 20 | 30 | 40 | 50 | ··· | 60 | 70 |
| YOKOHAMA | 045 | 40 | 30 | 20 | 10 | 20 | 30 | 40 | ··· | 50 | 60 |
| NAGOYA | 052 | 50 | 40 | 30 | 20 | 10 | 20 | 30 | ··· | 40 | 50 |
| OSAKA | 06 | 60 | 50 | 40 | 30 | 20 | 10 | 20 | ··· | 30 | 40 |
| KYOTO | 075 | 70 | 60 | 50 | 40 | 30 | 20 | 10 | ··· | 20 | 30 |
| ⋮ | ⋮ | ⋮ | ⋮ | ⋮ | ⋮ | ⋮ | ⋮ | ⋮ | | ⋮ | ⋮ |
| HIROSHIMA | 082 | 80 | 70 | 60 | 50 | 40 | 30 | 20 | ··· | 10 | 20 |
| HUKUOKA | 092 | 90 | 80 | 70 | 60 | 50 | 40 | 30 | ··· | 20 | 10 |

[TABLE B:VENDOR-BASED CHARGE TABLE]

(UNIT:YEN)

| | VENDOR A | VENDOR B | VENDOR C | VENDOR D | VENDOR E | VENDOR F | VENDOR G |
|---|---|---|---|---|---|---|---|
| VENDOR A | 15 | 20 | 25 | 35 | 35 | 40 | 25 |
| VENDOR B | 20 | 10 | 20 | 40 | 50 | 45 | 20 |
| VENDOR C | 25 | 20 | 10 | 30 | 40 | 35 | 20 |
| VENDOR D | 35 | 40 | 30 | 20 | 50 | 45 | 30 |
| VENDOR E | 35 | 50 | 40 | 50 | 30 | 55 | 40 |
| VENDOR F | 40 | 45 | 35 | 45 | 55 | 25 | 35 |
| VENDOR G | 25 | 20 | 20 | 30 | 40 | 35 | 10 |

FIG.7

[CHARGING LIST TABLE]

| ADDRESS | TELEPHONE NUMBER | ORIGINATION DATE | CHARGE(YEN) |
|---|---|---|---|
| SATO XX | 03-XXXX-XXXXX | 1998/1/3.16:25 | 30 |
| SATO XX | 03-XXXX-XXXXX | 1998/1/3.17:03 | 30 |
| YAMADA XX | 082-XXX-XXXXX | 1998/1/3.19:42 | 85 |
| INOUE XX | 092-XXX-XXXXX | 1998/1/3.19:59 | 70 |
| SUZUKI XX | 045-XXX-XXXXX | 1998/1/4.08:16 | 10 |
| YAMADA XX | 082-XXX-XXXXX | 1998/1/4.19:42 | 85 |
| TAKAHASHI XX | 06-XXXX-XXXXX | 1998/1/5.17:03 | 60 |
| | | | |
| MURAMATU XX | 075-XXX-XXXXX | 1998/1/3.17:03 | 15 |
| | | MONTHLY CALL CHARGE | 3,552 |

INFORMATION COMMUNICATION TERMINAL WITH CHARGING MANAGEMENT FUNCTION

BACKGROUND OF THE INVENTION

1. Field of the Invention

The present invention relates to an information communication terminal with a charging management function which has a message originating function and, more particularly, to an information communication terminal with a charging management function, such as a radio pager, which has a destination pager call number directory (to be simply referred to as a telephone number directory hereinafter) function, an outgoing message creation function, and a tone dialer originating function.

2. Description of the Prior Art

A conventional information communication terminal such as a radio pager having a message originating function is disclosed in, for example, Japanese Unexamined Patent Publication No. 06-209276. The disclosed technique provides an information communication terminal that can be used as a data transmission apparatus or auxiliary data transmission apparatus, which is used by a general user to provide information through the transmitter of a telephone set after creating a message containing character information to be transmitted, and converting the outgoing message information into a DTMF (Dual-Tone Multi-Frequency) signal.

FIG. 1 is a block diagram schematically showing the overall arrangement of the above information communication terminal as a prior art.

A radio signal from a radio base station is received through an antenna 101. A radio section 102 demodulates the modulated signal. A decoder 103 checks whether the selective call number of the self-receiver coincides with the signal demodulated by the radio section 102, and extracts call discrimination information and an information bit. The selective call number of the self-receiver is stored in an EEP-PROM 104.

A key input section 105 outputs instructions based on various keys to a control section 106. The control section 106 performs control on the basis of information from a memory storing various control programs, a timer, an input register for holding key input operation in the key input section 105, and a peripheral interface. A conversion table 107 stores a unique matrix character table for converting character data into numerical data. A reverse conversion table 108 stores a unique matrix character table for converting numerical data into character data. A CG section 109 stores pattern data of characters. A reception buffer 110 temporarily stores incoming message information and is used as a work area. An incoming message memory 111 has a plurality of memory banks and stores pieces of incoming message information. A message buffer 112 temporarily stores message information and is used as a work area. A message memory 113 stores destination data and latest input message information, and has a plurality of memory banks storing stereotyped message information. A TEL bank memory 114 stores pieces of destination pager call number (to be simply referred to as telephone number hereinafter) information, together with their abbreviated numbers and identification information on the pagers. A tone signal generating section 115 converts the numerical data input from the control section 106 into a DTMF signal and outputs it from a speaker 116. A conversion buffer 117 temporarily stores the incoming message read out from the incoming message memory 111 by the control section 106. A display buffer 118 temporarily stores the character data or numeral data for display which is output from the control section 106 to a display section 119.

The operation of this prior art will be described next.

When message input is directed by operation at the key input section 105, the control section 106 reads out a character pattern corresponding to the input instruction from the CG section 109, stores it in the display buffer 118, and displays it on the display section 119. This display data is also stored in the message buffer. In addition, the display data is stored in the latest input message information area in the message memory 113 in response to a registration instruction from the key input section 105. Thus, the message input is terminated. When a link request to link the created message information to a destination telephone number is selected through the key input section 105, a destination telephone number can be selected from telephone number information of the contents in the TEL bank memory 114 for which pager identification information flags are set (these pager identification information flags are registered in advance in the TEL bank memory). The selected destination telephone number is registered in the destination data area in the message memory 113.

If the link request is not selected, and registration of the telephone number in the message memory 113 is complete, a "DTMF send request wait" state is set. If the user outputs a DTMF send request through the key input section 105 without selecting a link request, the control section 106 reads out the registered message information from the latest input message information area in the message memory 113, and converts the character data of the message into numerical data on the basis of the unique matrix character table in the conversion table 107. In addition, the control section 106 causes the tone signal generating section 115 to convert the converted numerical data into a DTMF signal following 2-digit numerical data "*7" designating a free message code, and outputs it from the speaker 116. When a DTMF send request is generated through the key input section 105 after registration of the telephone number in the message memory 113 is completed, the telephone number registered in the destination data area of the message memory 113 is converted into a DTMF signal by the tone signal generating section, and the signal is output from the speaker 116. When transmission of the telephone number as a tone is complete, the "DTMF send request wait" state is set again. When a DTMF send request is generated again through the key input section 105 afterward, the latest input message information in the message memory 113 is converted into numerical data by the same method as that described above, and the message information converted into the numerical data is converted into a DTMF signal by the tone signal generating section 115. This signal is output from the speaker 116. In addition, stereotyped message information is transmitted as a DTMF signal by the same procedure as that described above.

In a conventional information communication terminal having a charging function, a processing control section notifies the user of incoming information, and stores a message rate in a charge information storage means. When a charge information send request signal transmission means is accessed, the contents of the charge information storage means are converted into a predetermined frequency signal and sent to a host station. With this operation, in charging operation, the message rate is calculated only when the information communication terminal confirms the reception of the signal.

A conventional charging scheme of this type is disclosed in Japanese Unexamined Patent Publication No. 1-238363. According to an information communication terminal having the charging function disclosed in this reference, as shown in FIG. 2, when a radio reception means 920 confirms the reception of a call, the incoming information is converted into a signal sound to be notified, and its contents are displayed. At the same time, the charge information stored in a charge information storage means 930 is updated. Charge information in a predetermined period is read out from the charge information storage means 930 by operating a charge information send request signal output means 950. This information is converted into a predetermined frequency signal and sent to a host station through a charge information output means 940 and the handset of a telephone set. When the host station transmits filed incoming information, the charge information is updated. With this operation, only charge information corresponding to a message for which termination is confirmed by the information, communication terminal is registered.

The following problems, however, arise in the conventional information communication terminal.

First, in a receiving information communication terminal with a message output function, since a history of a call count, destinations and the like and a call charging list are not managed, the charging state cannot be known on the caller side. As a consequence, a caller charging service system cannot be used.

Second, since different call charges are set in correspondence with different communication distances according to the current call rate systems, and the accounting rate system per call varies among service vendors, the information communication terminal cannot follow variations in communication state and call rate system. As a consequence, in charging operation, the information communication terminal cannot cope with variations in charge with variations in communication distance or among different service vendors. The accuracy of call charge calculation is therefore poor.

SUMMARY OF THE INVENTION

The present invention has been made in consideration of the above situation in the prior art, and has as its object to provide an information communication terminal with a charging management function, which supervises call charges and manages charging histories on the user side in caller charging services.

It is another object of the present invention to provide an information communication terminal with a charging management function, which has a charging collation function capable of coping with different call rate systems.

It is still another object of the present invention to provide an information communication terminal with a charging management function, which implements a charging collation function of improving the reliability of charging contents by calculating using call rate systems assuming different conditions with an easy operation procedure.

In order to achieve the above objects, according to the first aspect of the present invention, there is provided an information communication terminal with a charging management function, comprising storage means for receiving and storing an incoming message of a radio signal transmitted from a base station, message creation means for editing contents of the stored incoming message or creating a new message, means for adding a pager call number of a destination to message information edited or created by the message creation means, means for outputting the message information and the pager call number of the destination as information data through a push-phone, and means for supervising the destination of the information data and performing charging management.

The means for performing charging management in the first aspect comprises means for converting a public line connection into a tone signal, means for making a charge table correspond to a destination of the tone signal, means for calculating a value corresponding to the charge table, and means for performing list management of a history of the calculated value.

In addition, in order to achieve the above objects, according to the second aspect of the present invention, there is provided an information communication terminal with a charging management function, comprising storage means for receiving and storing an incoming message of a radio signal transmitted from a base station, message creation means for editing contents of the stored incoming message or creating a new message, means for adding a pager call number of a destination to message information edited or created by the message creation means, means for outputting the message information and the pager call number of the destination as DTMF signals, and means for performing charge calculation management by using the pager call number of the destination which has been originated by using the DTMF signals.

The means for performing charge calculation/management in the second aspect comprises means for updating or changing contents of the charge table, means for retrieving charge information data corresponding to the pager call number of the destination from the charge table, means for calculating a value of the charge information data, and means for performing list management of a history of the calculated value.

Furthermore, the means for updating and changing the charge table contents in the second aspect comprises one or a proper combination of a plurality of means of a means for receiving information from means for receiving table information from a radio channel like the message, and correcting/editing or rewriting the information, a means for receiving information from means for receiving table information from a wire line interface such as an ISDN, public network, or PC network, and correcting/editing or rewriting the information, a means for receiving information from means for receiving table information from an IrDA optical communication interface, and correcting/editing or rewriting the information, and a means for receiving information from means for receiving table information upon key input operation by an operator, and correcting/editing or rewriting the information.

As is obvious from the respective aspects described above, the present invention has the following first effect. The destination of an outgoing message is discriminated by using the DTMF transmission function, and a corresponding call charge is searched out by using the charge table data held by the terminal itself and notified to the user. In addition, since history management can be implemented by using a caller list including charge information within a limited period of time, the state of call charges can be managed on the caller side. In other words, a caller charging service system can be used.

The present invention has the following second effect. A plurality of tables such as a charge table based on different distances and a charge table based on different service vendors are prepared. Call rate system conditions can be arbitrarily selected in units of telephone numbers registered in each telephone directory. This apparatus can therefore cope with various call rate system conditions. In addition, even if the accounting rate system changes, the contents of a corresponding charge table can be quickly updated. Therefore, a call charge corresponding to an accounting rate system can be calculated with high precision.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIG. 5 is a view showing a management table in a caller charging supervisory control section in the radio pager with the charging management function according to the first embodiment of the present invention shown in FIG. 3;

FIG. 6A is a view showing a distance-based charge table held by a charge table memory section in the radio pager with the charging management function according to the first embodiment of the present invention shown in FIG. 3;

FIG. 6B is a view showing a vendor-based charge table held by the charge table memory section in the radio pager with the charging management function according to the first embodiment of the present invention shown in FIG. 3;

FIG. 7 is a view showing a charging list table managed by the caller charging supervisory control section in the radio pager with the charging management function according to the first embodiment of the present invention shown in FIG. 3;

DETAILED DESCRIPTION OF PREFERRED EMBODIMENTS

Several preferred embodiments of the present invention will be described below with reference to the accompanying drawings.

The first embodiment of the present will be described first by taking a radio pager as an example with reference to FIGS. 3 to 9.

In a radio pager with a charging management function according to the first embodiment of the present invention, telephone number (pager call number) directory data is set/registered in a telephone number directory memory in advance by operation through a key input section. In addition, of the registered telephone number directory data, telephone numbers like pager call numbers to be linked to outgoing message data are registered in a dial board in advance.

The user can select an outgoing message from the data registered in advance in an outgoing message memory by operation through the key input section or data in an incoming message memory.

To send a message, user operates the key input section while viewing the details of the selected outgoing message on the display, and chooses between reading out registered data from the dial board and linking the destination telephone number to the message and not linking it. If the user decides not to link the destination telephone number to the message, the control section converts the outgoing message data displayed on the screen into a key code corresponding to push-phone keys and transfers the data to the tone signal generating section. The tone signal generating section converts the data into a DTMF signal to output a signal sound from the speaker. In this case, since no destination telephone number can be specified, this operation does not incur any charge.

If the user decides to link the destination telephone number to the message, the tone signal generating section converts the telephone number into a DTMF signal to output a signal sound from the speaker. As a result, line connection is made through the transmitter of the telephone set. Thereafter, the user operates the key input section to re-send; it makes the control section convert the outgoing message data displayed on the screen into a key code corresponding to push-phone keys. The control section then transfers the data to the tone signal generating section. The tone signal generating section converts the data into a DTMF signal to output a signal sound from the speaker, thereby reading the destination from the telephone number. The caller charging supervisory control section calculates the call charge per call. Call charges are made to correspond to destinations in advance in each charge table stored in the charge table memory section.

The contents of each table in the charge table memory can be changed in accordance with an instruction from a host station upon reception of a special control format aimed at control.

Figure 1:
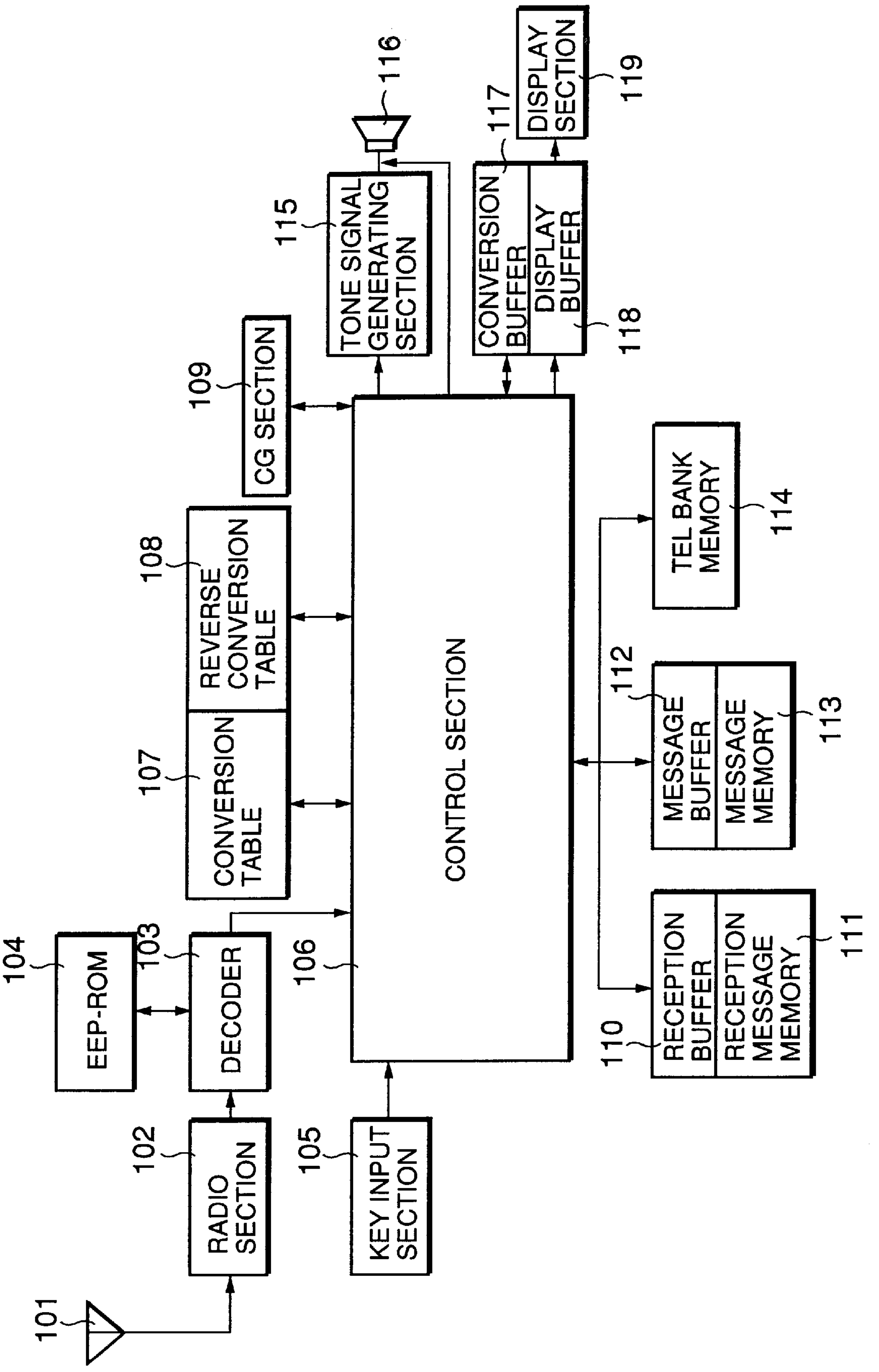
FIG.1 PRIOR ART
FIG. 1 is a block diagram schematically showing the overall arrangement of a conventional radio pager.
Figure 2:
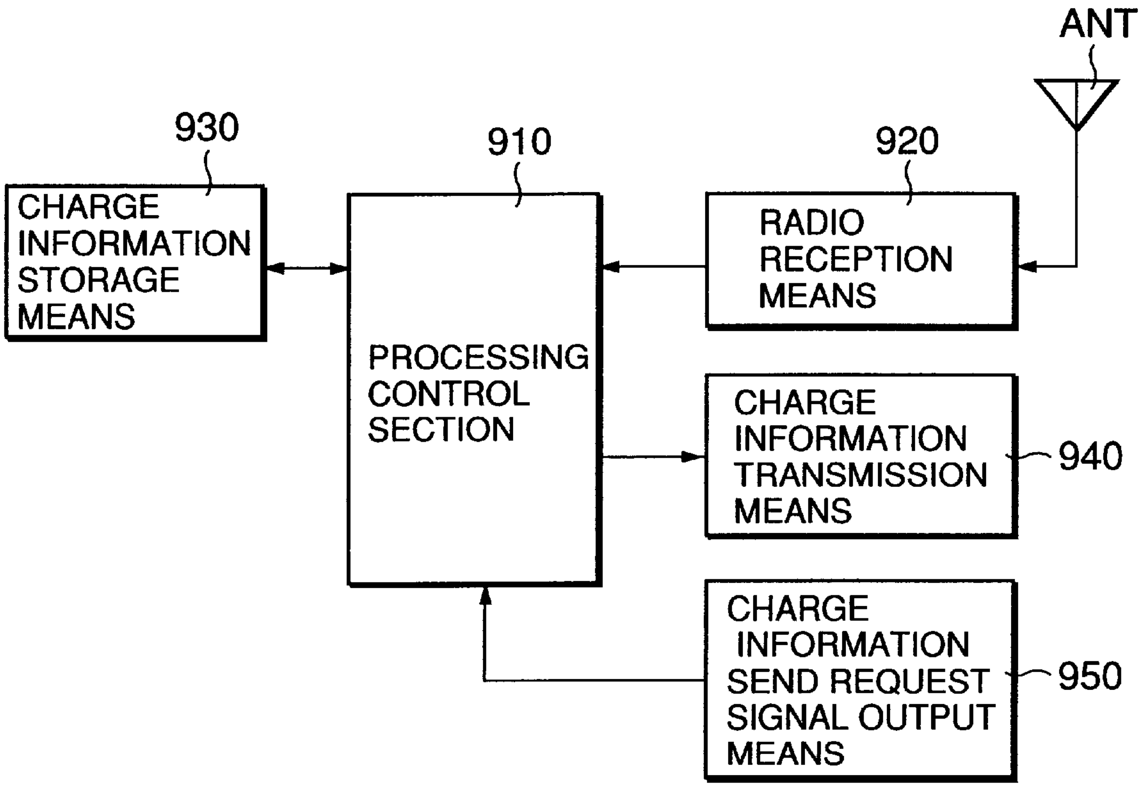
FIG.2 PRIOR ART
FIG. 2 is a block diagram showing the arrangement of the charging function section of the radio pager disclosed in Japanese Unexamined Patent Publication No. 1-23836.
Figure 3:
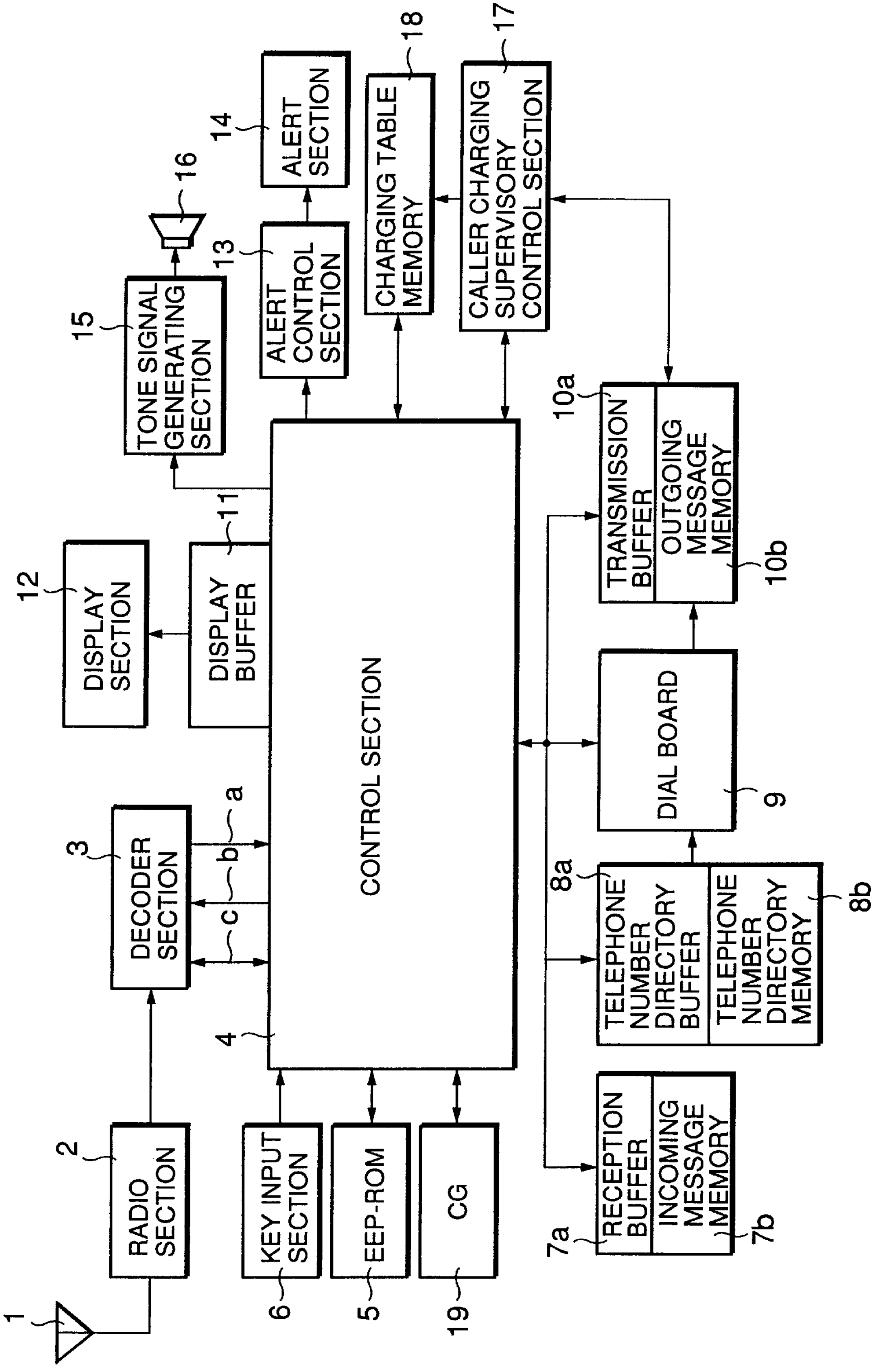
FIG. 3 is a block diagram schematically showing the overall arrangement of a radio pager with a charging management function according to the first embodiment of the present invention.

FIG. 3 is a block diagram schematically showing the overall arrangement of a radio pager with a charging management function according to the first embodiment of the present invention.

The radio pager with the charging management function according to the first embodiment of the present invention includes an antenna section 1 for receiving a radio signal, a radio section 2 for performing radio signal processing, a decoder section 3 for decoding received data, a control section 4 for performing data management and interface control for peripheral devices, an EEP-ROM 5 for storing set information, a key input section 6 for inputting information from an operator, a CG section 19 storing character code data, a reception buffer 7*a* serving as an incoming message work area, an incoming message memory 7*b* for storing telephone number directory data information, a telephone number directory buffer 8*a* as a telephone number directory work area, a telephone number directory memory 8*b* for accumulating and storing telephone number directory data information, a dial board 9 for extracting a telephone number to be linked to an outgoing message from telephone number directory contents and storing it, a transmission buffer 10*a* serving as an outgoing message work area, an outgoing message memory 10*b* for storing outgoing message information, a display buffer 11 for temporarily storing display data, an alert control section 13 for driving an alert device, a notification section 14 as alert means such as a buzzer, LED, and vibrator, a tone signal generating section 15 for converting an outgoing message into a DTMF signal by replacing it with a push-phone key code, a speaker 16 for outputting a tone signal, a caller charging supervisory control section 17 for identifying the destination of an outgoing message from a destination telephone number, calculating a call charge corresponding to each charge table, and performing management control on charging lists, and a charge table memory section 18 for extracting a telephone number to be linked to an outgoing message from telephone number directory contents, and storing a plurality of charging lists.

The modulated signal obtained through the antenna section 1 is demodulated by the radio section 2. A plurality of selective call numbers of the receiver are set in the EEP-ROM 5. Reception display is performed in response to a call using any of the set selective call numbers. The control section 4 reads out a plurality of selective call numbers (1 to N) of the self-receiver which are set in the EEP-ROM 5 through a data bus c, and sets them in the decoder section 3. The decoder section 3 collates each selective call number of the receiver sent through an address bus b with the signal demodulated by the radio section 2. If one of the call numbers coincides with the demodulated signal, the decoder section 3 outputs, to the control section 4 through a signal sending line a, information indicating the detection of the selective call number and call discrimination information (a natural number of 1 to N) discriminating a specific one of the N selective call numbers of the self-receiver. The decoder section 3 then performs error correction of data sent following the selective call number, and transfers only information bits to the control section 4 in units of code words (clusters of information data). The control section 4 receives the call discrimination information from the decoder section 3 and stores the information in the RAM in the control section 4 or the reception buffer 7*a* outside the control section 4.

If data is continuously sent from the decoder section 3, it is checked whether the data is information bit data or a selective call code. If the data is information bit data, the data is continuously stored in the RAM in the control section 4 or the reception buffer 7*a* outside the control section 4, and the information bits are assembled.

After all the information bit data are received, the control section 4 stores the information bit data in the reception buffer 7*a*, and at the same time, drives the notification section 14 including an alert device such as a buzzer, LED, and vibrator to notify the terminal holder. The control section 4 displays the received message contents on the display section 12 through the display buffer 11. Information indicating a specific one of the alert devices which is to be used for notification is set in the EEP-ROM 5 in advance. A device to be used is determined in accordance with the combination of this information and information set through the key input section 6. The message stored in the reception buffer 7*a* can be displayed on the display section 12 through the key input section 6.

The above description concerns the arrangement for storing incoming messages in the reception buffer 7*a*.

Arbitrary data stored in the incoming message memory 7*b* can be copied to the outgoing message memory 10*b* in accordance with operation performed by the operator through the key input section 6.

The operator operates the key input section 6 to create a new outgoing message. This message can be registered in the outgoing message memory 10*b* through the transmission buffer 10*a*.

The dial board 9 is a memory area in which only telephone numbers selected from the telephone numbers registered in the telephone number directory memory 8*b* in accordance with operation performed by the operator through the key input section 6 are registered, and serves as a function block to be used as a destination list table when memo pad contents are to be transmitted.

The above description concerns the means for storing data in each memory area.

To send an outgoing message using data stored in each memory area, the operator operates the key input section 6 to select arbitrary message information from the message information stored in the outgoing message memory 10*b*. This information is sent to the control section 4. The control section 4 sets the selected message information as data in the display buffer 11, and displays the details of this outgoing message by using the display section 12. A specific destination of the outgoing message contents selected after displayed in detail is selected from the destination list in the dial board 9, and the corresponding information is converted into a DTMF signal by the tone signal generating section 15. This signal is output from the speaker 16. After the destination telephone number is transmitted, the operator checks line connection. The operator then operates the key input section 6 to make the tone signal generating section convert the outgoing message into a DTMF signal. This signal is output from the speaker 16.

The sent destination telephone number is monitored by the caller charging supervisory control section 17. After the outgoing message is transmitted, the caller charging supervisory control section 17 selects the corresponding condition from the charge table memory section 18. Addition processing is performed by using the charging list managed by the caller charging supervisory control section 17, thereby performing current call charge supervisory control. The operator can set a condition in the charge table memory section 18 for each telephone number. With regard to setting of table contents, a default table is prepared, and table information is received from a host station and the table contents are updated every time the accounting rate system changes.

Figure 4:
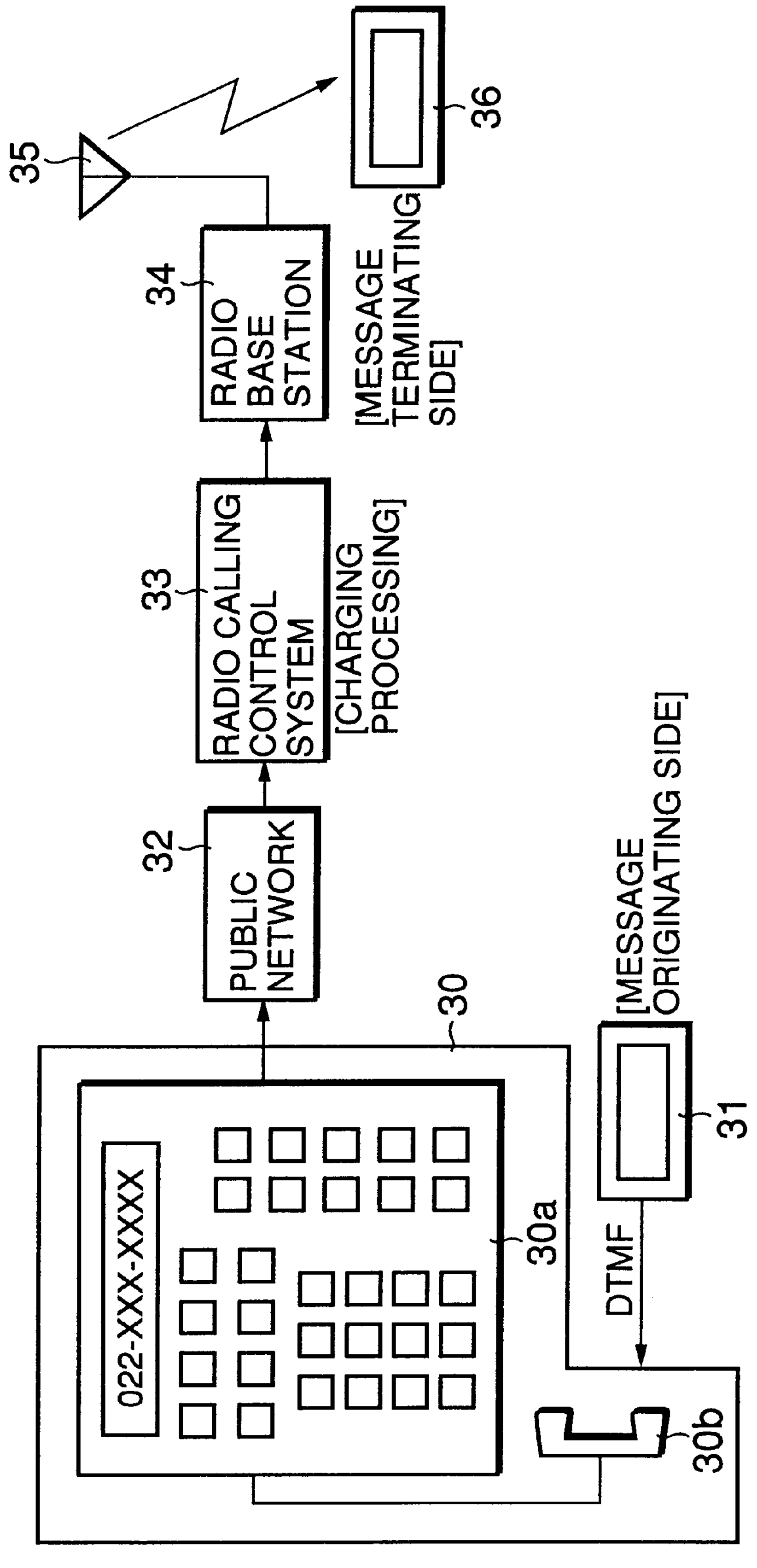
FIG. 4 is a block diagram showing the main system of the radio pager with the charging management function according to the first embodiment of the present invention shown in FIG. 3.

FIG. 4 shows the calling system of the radio pager with the charging management function according to the first embodiment of the present invention. When a DTMF tone signal is sent from a radio pager 31 with a charging management function on the caller side to the transmitter of a handset 30*b* of a push-phone 30, a code corresponding to push keys 30*a* is input as outgoing message information with a destination telephone number to a radio calling control system 33 through a public network 32. A radio base station 34 corresponding to the telephone number (pager call number) is then selected from a plurality of radio base stations, and the selective call number of each pager terminal and the information message are sent in a predetermined time slot from an antenna 35 of the selected radio base station 34. A pager terminal 36 at the destination (callee side) corresponding to this selective call number receives the information message and receives the message upon each predetermined process.

FIG. 5 shows a management table aimed at supervisory control of charging operation of the caller charging supervisory control section 17 in the radio pager 31 with the charging management function according to the first embodiment of the present invention in FIG. 3. In this table, a charge calculating method is selected in correspondence with each telephone number registered in the telephone number directory memory, and the call charge per call is calculated. Assume that after an outgoing message is attached to a corresponding telephone number, the message is converted into a DTMF signal, and the signal is sent. In this case, charge data is extracted from this table.

FIGS. 6A and 6B shows a management table held by the charge table memory section 18 in the radio pager 31 with the charging management function according to the first embodiment. This table is comprised of a plurality of tables corresponding to different call rate systems. For example, tables A and B are prepared. In table A, different charges are set in accordance with different communication distances. In table B, different charges are set in accordance with different service vendors.

FIG. 7 shows a charging list table managed by the caller charging supervisory control section 17 in the radio pager 31 with the charging management function according to the first embodiment of the present invention in FIG. 3. This table is used to manage an origination history of destinations, telephone numbers, origination dates, and call charges on the basis of telephone numbers actually used by using the tables in FIGS. 5, 6A, and 6B, and allows the operator to view the origination history data of call charges in current caller charging operation in accordance with the need of the operator.

Figure 8:
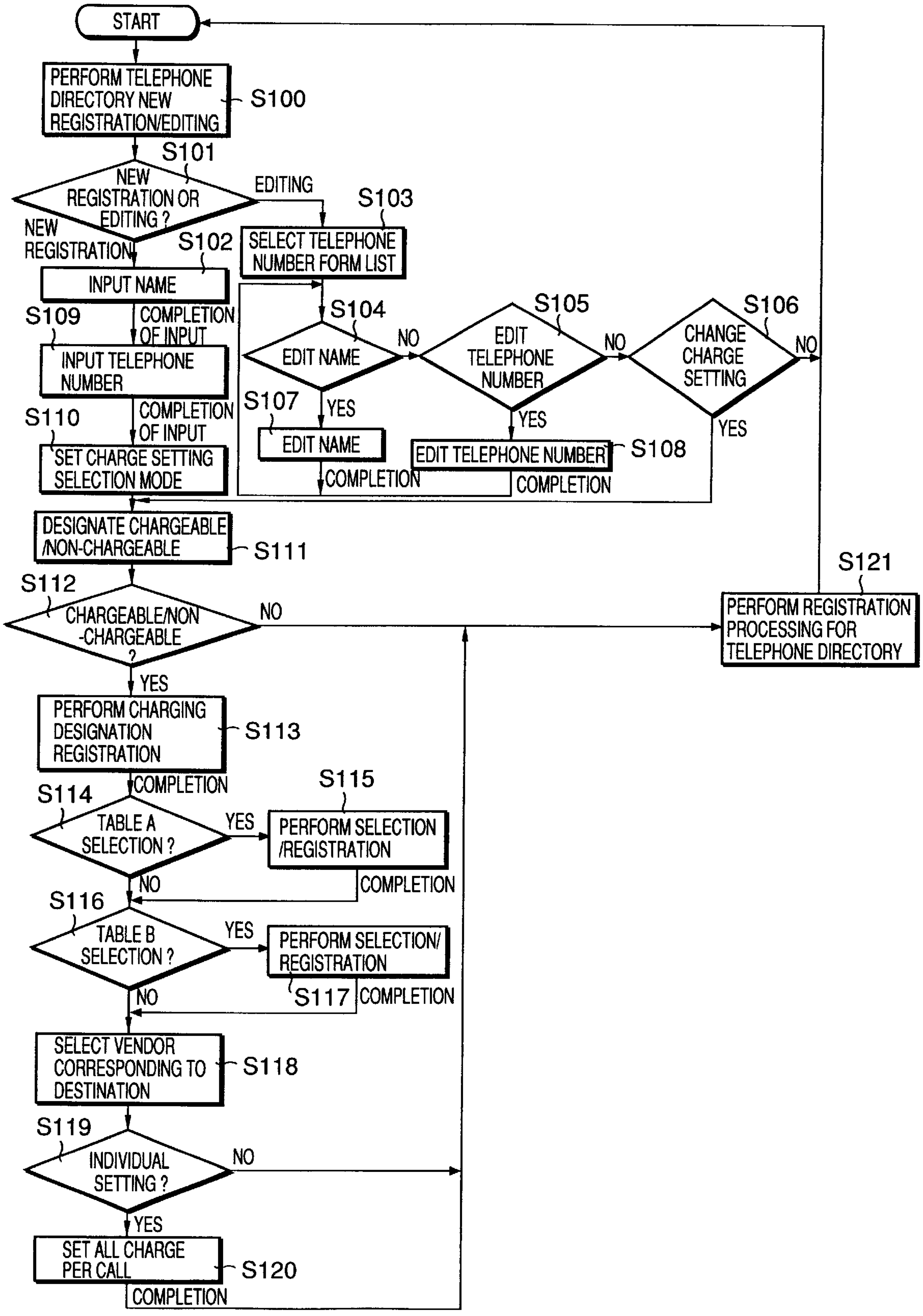
FIG. 8 is a flow chart showing a procedure for setting a management table supervised/controlled in the caller charging supervisory control section.

FIG. 8 is a flow chart showing a procedure for setting a management table subjected to supervisory control in the caller charging supervisory control section 17 (see FIG. 3). If new registration is determined in a telephone number directory new registration/editing (step S100) wait state, the flow advances to a name input (step S102) state. After a name is input, the flow advances to a telephone number input (step S109) state. After a telephone number is input, the flow advances to a charge setting selection mode (step S100), and a chargeable/non-chargeable designation (step S111) wait state is set. If editing is determined in the telephone number directory new registration/editing (step S100) wait, a telephone number directory list is displayed, and a list selection (step S103) state is set.

After a destination to be edited is selected from the telephone number directory list, name editing (step S104), telephone number editing (step S105), or charge setting change (step S106) is selected. If there is no menu to select, the flow returns to "start". If name editing is selected, the flow advances to a name editing (step S107) mode. If telephone number editing is selected, the flow advances to a telephone number editing (step S108) mode. If charge setting change is selected, the flow advances to a chargeable/non-chargeable designation (step S111) wait state. The flow then advances to a chargeable/non-chargeable designation determination (step S112) state.

If "non-chargeable" is determined in chargeable/non-chargeable designation determination with respect to the input data selected in new registration or editing processing, registration processing (step S121) is performed for the telephone number directory. The flow then returns to "start". If "chargeable" is determined in chargeable/non-chargeable designation determination (step S112), the flow advances to a charging designation registration (step S113) state to select each charging condition.

As a condition in this case, it is determined in table A selection/non-selection determination (step S114) whether a charge table based on different communication distances is used. If "selection" is determined, registration processing is performed with respect to the management table in selection registration (step S115). The flow advances to table B selection/non-selection determination (step S116). If "non-selection" is determined in the above table A selection/non-selection determination (step S114) state, the flow advances to the table B selection/non-selection determination (step S116) state.

If "non-selection" is determined in the data B selection/non-selection determination (step S116) processing of determining whether to use a charge table based on different service vendors, the flow advances to individual setting selection/non-selection determination (step S119). If "selection" is determined in table B selection/non-selection (step S116), registration processing is performed with respect to the management table in a selective registration (step S117) state, and the operator arbitrarily selects a service vendor corresponding to a destination telephone number in a destination service vendor selection (step S118) state. Thereafter, the flow advances to an individual setting selection/non-selection determination (step S119) state.

If "non-selection" is determined in the individual setting selection/non-selection determination (step S119) state, registration processing is performed with respect to the telephone number directory (step S121). The flow then starts to "start". If "selection" is determined in the individual setting selection/non-selection determination (step S119) state, the operator arbitrarily sets a call charge per call in correspondence with the destination telephone number as a transmission target (step S120). Upon completion of this processing, all set information is registered, and registration processing is performed with respect to the telephone number directory (step S121). The flow then shift to "start".

Figure 9:
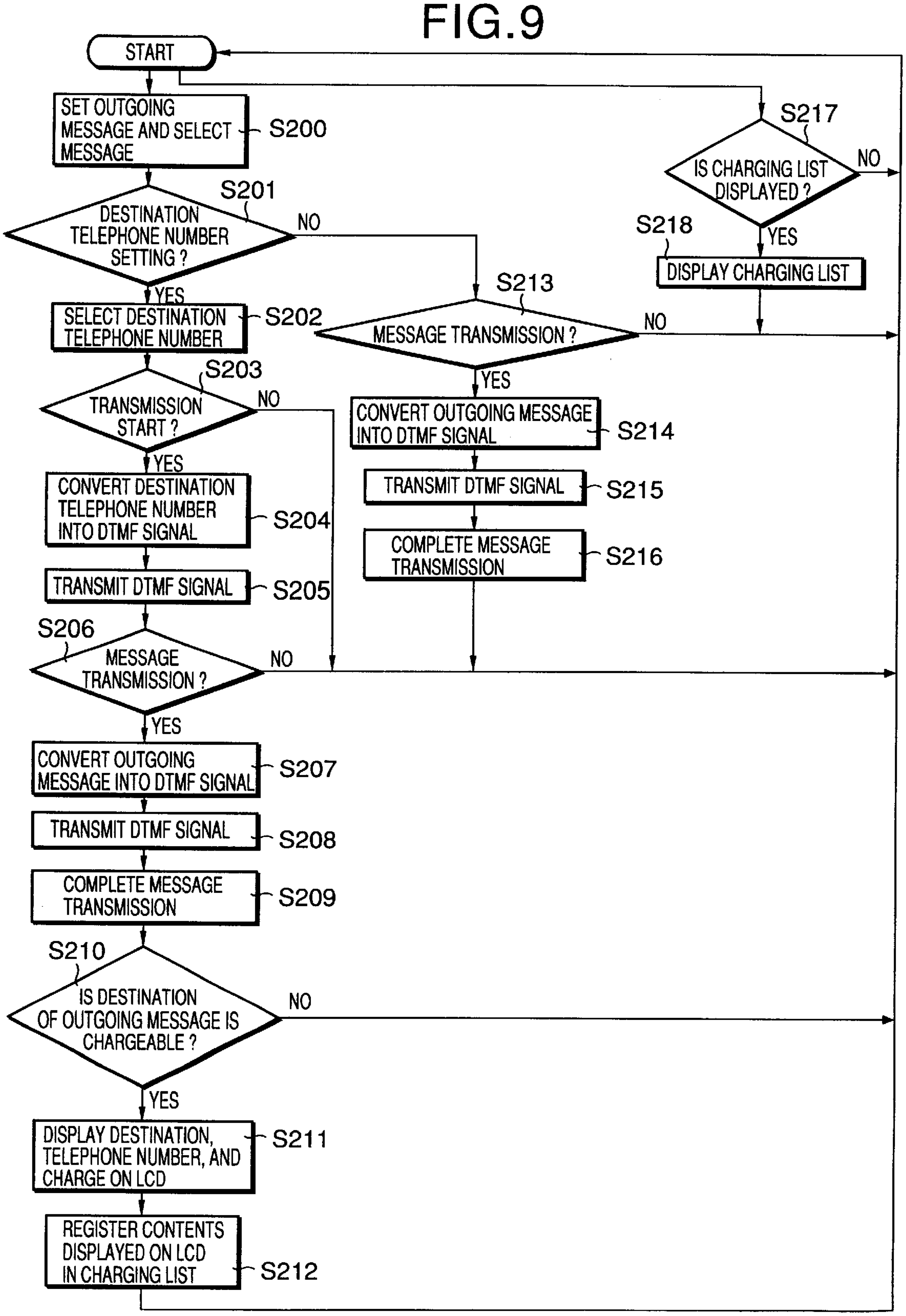
FIG. 9 is a flow chart showing a procedure for charging supervisory control in the caller charging supervisory control section in the first embodiment of the present invention shown in FIG. 3.

FIG. 9 is a flow chart showing charging supervisory control in the caller charging supervisory control section 17 according to the first embodiment of the present invention shown in FIG. 3. In outgoing message setting and message selection (step S200), an outgoing message is created and selected. If "non-setting" is determined in a setting/non-setting determination (step S201) state in which it is determined whether to set a destination telephone number to be attached to the outgoing message, the flow advances to a transmission/non-transmission determination (step S213) state in which it is determined whether to transmit the contents of the message. If "non-transmission" is determined, the flow returns to "start". If "transmission" is determined in a message transmission/non-transmission determination (step S213) state, the flow advances to outgoing message→DTMF signal conversion (step S214) to convert the message into a DTMF signal. The DTMF signal is then sent (step S215) to be output from the speaker. After the transmission of the message is completed (step S216), the flow returns to "start".

If "setting" is determined in the destination telephone number setting/non-setting determination (step S201) state, the flow advances to destination telephone number selection (step S202) mode to select a destination from an existing telephone number directory list.

If "non-start" is selected in a transmission start/non-start determination (step 203) state after a destination telephone number is selected, the flow returns to "start". If "start" is selected in the transmission start/non-start determination (step S203) state, the flow advances to destination telephone number→DTMF signal conversion (step S204) to convert the destination telephone number into a DTMF signal. This signal is output from the speaker in DTMF signal transmission processing (step S205).

If "non-transmission" is selected in a transmission/non-transmission determination (step S206) state in which it is determined whether to transmit the accompanying outgoing message after the telephone number is transmitted, the flow returns to "start". If "transmission" is determined in the message transmission/non-transmission determination (step S206) state, the flow advances to outgoing message→DTMF signal conversion (step S207) to convert the message into a DTMF signal. This signal is output from the speaker in DTMF signal transmission processing (step S208).

After the transmission of the message is completed (step S209), it is determined whether the destination telephone number to which transmission has been performed is chargeable (step S210). If it is determined that the telephone number is not chargeable, the flow returns to "start". If the destination is chargeable or "chargeable" is determined in the determination state (step S210), the name and telephone number of the destination and the call charge are displayed on the display section for a predetermined period of time (step S211), and the displayed call charge is registered in the charging list (step S212). The flow then returns to "start".

When a past charging history is to be viewed in accordance with operation by the operator, "display" is determined in a charging list display/non-display determination (step S217) state, thereby displaying the charging list (step S218) by extracting data from the supervisory control section.

The second embodiment of the present invention will be described next with reference to FIG. 10.

In a radio pager with a charging management function according to the second embodiment of the present invention, telephone directory data is set/registered in a telephone number directory memory in accordance with operation performed by an operator through a key input section. Of the registered telephone number directory data, telephone numbers, mainly the telephone numbers (call numbers) of pagers, which are to be linked to outgoing message data are registered in a dial board.

The user can select an outgoing message from the data registered in advance in an outgoing message memory by operation through the key input section or data in an incoming message memory.

When the outgoing message is to be transmitted, the user performs transmission operation through the key input section while the details the selected outgoing message are displayed, and chooses between reading out registered data from the dial board and linking the destination telephone number to the message and not linking it. If the user decides not to link the destination telephone number to the message, the control section converts the outgoing message data displayed on the screen into a key code corresponding to push-phone keys and transfers the data to the tone signal generating section. The tone signal generating section converts the data into a DTMF signal to output a signal sound from the speaker. In this case, since no destination telephone number can be specified, this operation does not incur any change.

If the user decides to link the destination telephone number to the message, the tone signal generating section converts the telephone number into a DTMF signal to output a signal sound from the speaker. As a result, line connection is made through the transmitter of the telephone set. Thereafter, the user operates the key input section to re-send; it makes the control section convert the outgoing message data displayed on the screen into a key code corresponding to push-phone keys. The control section then transfers the data to the tone signal generating section. The tone signal generating section converts the data into a DTMF signal to output a signal sound from the speaker, thereby reading the destination from the telephone number. The caller charging supervisory control section calculates the call charge per call. Call charges are made to correspond to destinations in advance in each charge table stored in the charge table memory section.

In addition, this apparatus includes a means for loading data through a radio channel, which can change the contents of each table in the charge table memory in accordance with an instruction from a host station upon reception of a special control format aimed at control, a means for loading data through a wire line such as a public line or a PC link for loading data from a personal computer, a means for loading data through an optical communication line by using an IrDA device, and a means for loading table data upon key input operation by the operator.

Figure 10:
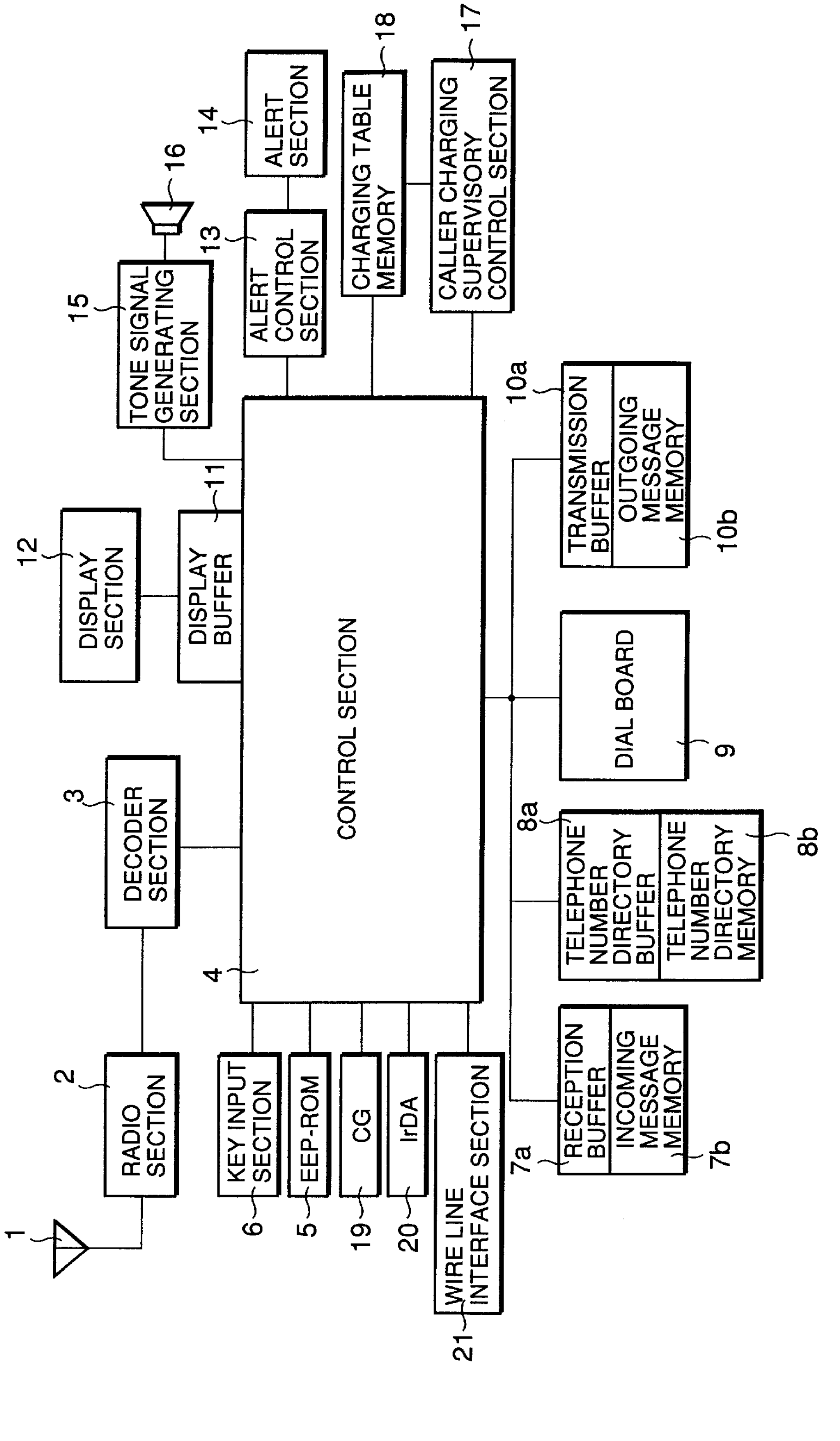
FIG. 10 is a block diagram schematically showing the overall arrangement of a radio pager with a charging management function according to the second embodiment of the present invention.

FIG. 10 is a block diagram schematically showing the overall arrangement of a radio pager with a charging management function according to the second embodiment of the present invention.

The radio pager with the charging management function according to the second embodiment of the present invention includes an antenna section 1 for receiving a radio signal, a radio section 2 for performing radio signal processing, a decoder section 3 for decoding received data, a control section 4 for performing data management and interface control for peripheral devices, an EEP-ROM 5 for storing set information, a key input section 6 for inputting information from an operator, a CG section 19 storing character code data, a reception buffer 7*a* serving as an incoming message work area, an incoming message memory 7*b* for storing telephone number directory data information, a telephone number directory buffer 8*a* as a telephone number directory work area, a telephone number directory memory 8*b* for accumulating and storing telephone number directory data information, a dial board 9 for extracting a telephone number to be linked to an outgoing message from telephone number directory contents and storing it, a transmission buffer 10*a* serving as an outgoing message work area, an outgoing message memory 10*b* for storing outgoing message information, a display buffer 11 for temporarily storing display data, an alert control section 13 for driving an alert device, a notification section 14 as alert means such as a buzzer, LED, and vibrator, a tone signal generating section 15 for converting an outgoing message into a DTMF signal by replacing it with a push-phone key code, a speaker 16 for outputting a tone signal, a caller charging supervisory control section 17 for identifying the destination of an outgoing message from a destination telephone number, calculating a call charge corresponding to each charge table, and performing management control on charging lists, a charge table memory section 18 for extracting a telephone number to be linked to an outgoing message from telephone number directory contents, and storing a plurality of charging lists, an IrDA device 20 as a means for loading data to correct/edit or rewrite the contents of the above charge table memory section, and a wire line interface section 21.

The modulated signal obtained through the antenna section 1 is demodulated by the radio section 2. A plurality of selective call numbers of the receiver are set in the EEP-ROM 5. Reception display is performed in response to a call using any of the set selective call numbers. The control section 4 reads out a plurality of selective call numbers (1 to N) of the self-receiver which are set in the EEP-ROM 5, and sets them in the decoder section 3. The decoder section 3 collates each selective call number of the receiver with the signal demodulated by the radio section 2. If one of the call numbers coincides with the demodulated signal, the decoder section 3 outputs, to the control section 4, information indicating the detection of the selective call number and call discrimination information (a natural number of 1 to N) discriminating a specific one of the N selective call numbers of the self-receiver. The decoder section 3 then performs error correction of data sent following the selective call number, and transfers only information bits to the control section 4 in units of code words (clusters of information data). The control section 4 receives the call discrimination information from the decoder section 3 and stores the information in the RAM in the control section 4 or the reception buffer 7*a* outside the control section 4.

If data is continuously sent from the decoder section 3, it is checked whether the data is information bit data or a selective call code. If the data is information bit data, the data is continuously stored in the RAM in the control section 4 or the reception buffer 7*a* outside the control section 4, and the information bits are assembled. After all the information bit data are received, the control section 4 stores the information bit data in the reception buffer 7*a*, and at the same time, drives the notification section 14 including an alert device such as a buzzer, LED, and vibrator to notify the terminal holder. The control section 4 displays the received message contents on the display section 12 through the display buffer 11. Information indicating a specific one of the alert devices which is to be used for notification is set in the EEP-ROM 5 in advance. A device to be used is determined in accordance with the combination of this information and information set through the key input section 6.

The message stored in the reception buffer 7*a* can be displayed on the display section 12 through the key input section 6. The above description concerns the arrangement for storing incoming messages in the reception buffer 7*a*.

Arbitrary data stored in the incoming message memory 7*b* can be copied to the outgoing message memory 10*b* in accordance with operation performed by the operator through the key input section 6.

The operator operates the key input section 6 to create a new outgoing message. This message can be registered in the outgoing message memory 10*b* through the transmission buffer 10*a*.

The dial board 9 is a memory area in which only telephone numbers selected from the telephone numbers registered in the telephone number directory memory 8*b* in accordance with operation performed by the operator through the key input section 6 are registered, and serves as a function block to be used as a destination list table when memo pad contents are to be transmitted. The above description concerns the means for storing data in each memory area.

To send an outgoing message using data stored in each memory area, the operator operates the key input section 6 to select arbitrary message information from the message information stored in the outgoing message memory 10*b*. This information is sent to the control section 4.

The control section 4 sets the selected message information as data in the display buffer 11, and displays the details this outgoing message by using the display section 12. A specific destination of the outgoing message contents selected after displayed in detail is selected from the destination list in the dial board 9, and the corresponding information is converted into a DTMF signal by the tone signal generating section 15. This signal is output from the speaker 16. After the destination telephone number is transmitted, the operator checks line connection. The operator then operates the key input section 6 to make the tone signal generating section convert the outgoing message into a DTMF signal. This signal is output from the speaker 16.

The sent destination telephone number is monitored by the caller charging supervisory control section 17. After the outgoing message is transmitted, the caller charging supervisory control section 17 selects the corresponding condition from the charge table memory section 18. Addition processing is performed by using the charging list managed by the caller charging supervisory control section 17, thereby performing current call charge supervisory control. The operator can set a condition in the charge table memory section 18 for each telephone number. With regard to setting of table contents, a default table is prepared, and table information is received from a host station and the table contents are updated every time the accounting rate system changes.

The contents of the charge table memory 18 can be corrected/edited and rewritten by several means.

The first means includes a means for loading table information from a host station through a channel, the radio section 2, and the control section 4 and writing the information in the charge table memory 18.

The second means includes a means for loading table information from a host system through the wire line interface section 21 and the control section 4 by using a wire line such as a public network or a PC link used for personal computer connection, and writing the information in the charge table memory 18.

The third means includes a means for loading table information from a host system through the IrDA device 20 and the control section 4 by using an optical communication line, and writing the information in the charge table memory 18.

The fourth means includes a means for loading table information through the control section 4 upon operation by the operator through the key input section 6, and writing the information in the charge table memory 18.

The present invention can use one or a combination of a plurality of the above four means for correcting and writing the contents of the charge table memory 18.

The arrangement of the radio pager according to the second embodiment is the same as that shown in FIG. 4. The management table for charging supervisory control in the caller charging supervisory control section 17 is the same as that shown in FIG. 5. The management table held by the charge table memory 18 is the same as that shown in FIGS. 6A and 6B. The charging list table managed by the caller charging supervisory control section 17 is the same as that shown in FIG. 7. A flow chart showing the procedure for setting a management table for supervisory control in the caller charging supervisory control section 17 is the same as that shown in FIG. 8. A flow chart showing the procedure for setting a charging list for charging control in the caller charging supervisory control section 17 is the same as that shown in FIG. 9. Hence, a description of these tables and procedures will be omitted.

Figure 11:
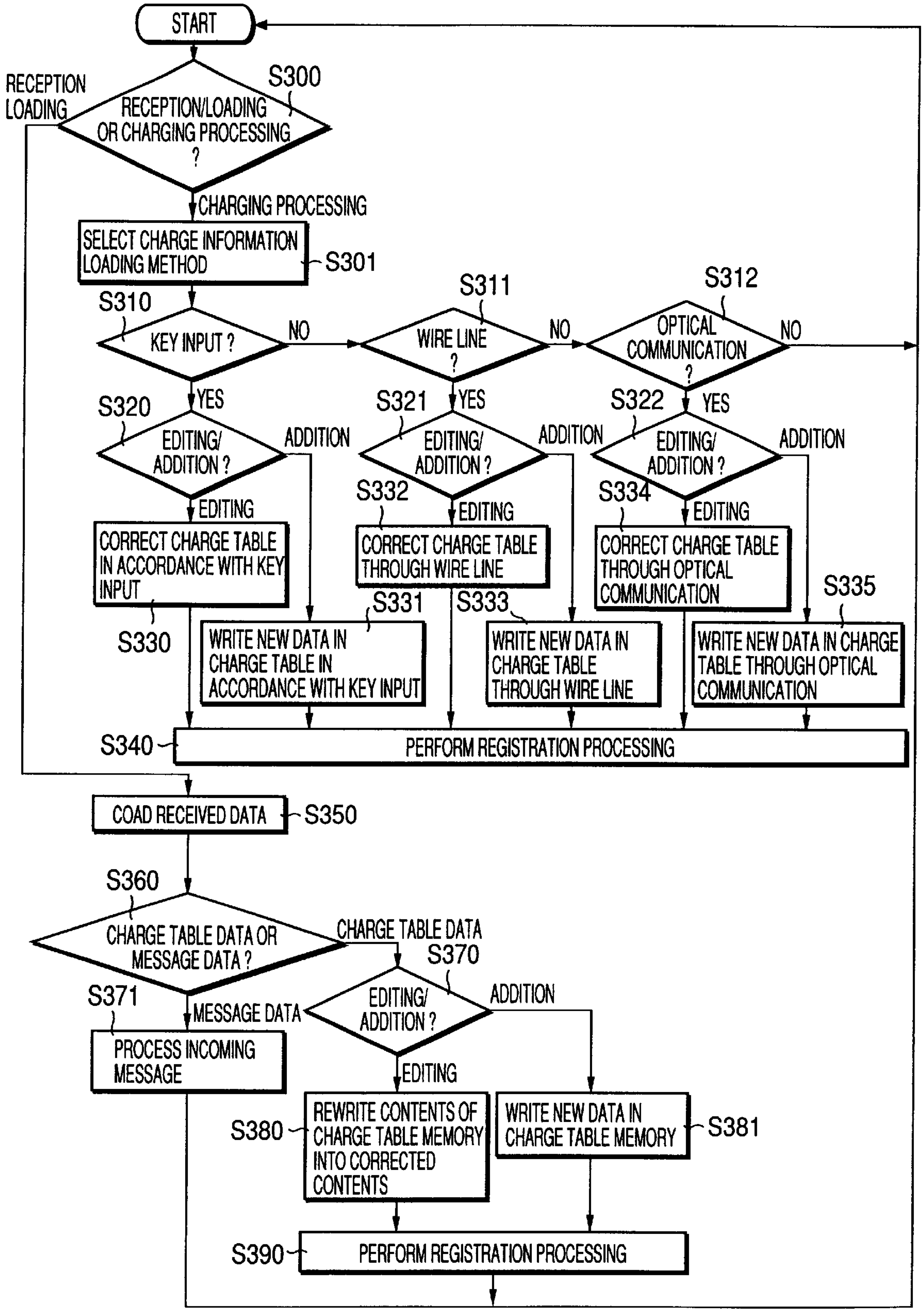
FIG. 11 is a flow chart showing a procedure for changing the table data contents in a charge table memory section or adding data thereto in the second embodiment of the present invention shown in FIG. 10.

FIG. 11 is a flow chart showing a procedure for changing the table data contents in the charge table memory 18 (FIG. 10) or adding data to the contents.

If "charging processing" is determined in reception loading or charging processing determination (step S300), "key input" (step S301), "wire line" (step S311), or "optical communication" (step S312) is selected in charge information loading method selection (step S301). If there is no menu to select, the flow returns to "start". If "key input" is selected, the flow advances to an editing/addition selection (step S320) mode. If "editing" is selected, correction processing (step S330) of the charge table is performed in accordance with key input by the operator, and registration processing (step S340) is executed. The flow then returns to "start". If "addition" is selected in the editing/addition selection (step S320) mode, new data write processing (step S340) of the charge table is performed in accordance with key input by the operator, and registration processing (step S340) is executed. The flow then returns to "start".

If "wire line" is selected in the charge information loading method selection (step S301), the flow advances to an editing/addition selection (step S321) mode. If "editing" is selected, wire connection is made between the radio pager of this embodiment and an interface serving as a communication partner device. Thereafter, correction processing (step S332) is performed for the charge table through the wire line, and registration processing (step S340) is executed. The flow then returns to "start". If "addition" is selected in the editing/addition selection (step S321) mode, wire connection is made between this radio pager and the interface serving as the communication partner device, and new data write processing (step S333) is performed with respect to the charge table through the wire line, and registration processing (step S340) is executed. The flow then returns to "start".

If "optical communication" is selected in the charge information loading method selection (step S301), the flow advances to an editing/addition selection (step S322) mode. If "editing" is selected, correction processing for the charge table (step S334) is performed between this radio pager and a remote device serving as a communication partner device through optical communication, and registration processing (step S340) is executed. The flow then returns to "start". If "addition" is selected in the editing/addition selection (step S322) mode, new data write processing (step S335) is performed with respect to the charge table between the this radio pager and a device serving as a communication partner device through optical communication, and registration processing (step S340) is in executed. The flow then returns to "start".

When the charting table is to be updated through a radio channel, charge table data or normal message data is identified from a reception format (step S360) in reception data loading operation (step S350). If it is determined that the received data is normal incoming message data, incoming message processing (step S371) is executed, and the flow returns to "start".

If a dedicated format indicating charge table data is received in reception data loading operation (step S350), the flow advances to an editing/addition selection (step S370) mode. If "editing" is determined from a dedicated format indicating charge table correction, the table data attached to the dedicated format is written into corrected contents in the charge table memory (step S380), and registration processing (step S390) is executed. The flow then returns to "start". If "addition" is determined from a dedicated format indicating charge table correction in the editing/addition selection (step S370) mode, the contents of the table data attached to the dedicated format are additionally written as a new table in the charge table memory (step S381), and registration processing (step S390) is executed. The flow then returns to "start". The above embodiment has exemplified the radio pager. However, the present invention is not limited to this. The present invention can be applied to information communication terminals such as a personal portable information communication device, a personal digital terminal, a personal handyphone, a portable information communication terminal, a radio communication terminal, a telephone terminal, a personal computer, an electronic notebook, and a video game device.

What is claimed is:

1. An information communication terminal with a charging management function, comprising:

storage means for receiving and storing an incoming message of a radio signal transmitted from a base station;

message creation means for editing contents of the stored incoming message or creating a new message;

means for adding a pager call number of a destination to message information edited or created by said message creation means;

means for outputting the message information and the pager call number of the destination as information data through a push-phone; and means for supervising the destination of the information data and performing charging management, wherein said means for performing charge management includes:

means for converting a public line connection into a tone signal;

means for making a charge table correspond to a destination of the tone signal;

means for calculating a call charge value corresponding to the charge table; and means for performing list management of a history of the calculated value.

2. An information communication terminal with a charging management function, comprising:

storage means for receiving and storing an incoming message of a radio signal transmitted from a base station;

message creation means for editing contents of the stored incoming message or creating a new message;

means for adding a pager call number of a destination to message information edited or created by said message creation means; and means for outputting the message information and the pager call number of the destination as DTMF signals, and means for performing charge calculation management by using the pager call number of the destination which has been originated by using the DTMF signals, wherein said means for performing charge calculation/management comprises:

means for updating or changing contents of the charge table;

means for retrieving charge information data corresponding to the pager call number of the destination from the charge table;

means for calculating a charge call value of the charge information data; and means for performing list management of a history of the calculated value.

3. A terminal according to claim 2, wherein said means for updating and changing the charge table contents comprises means for receiving information from means for receiving table information from a radio channel like the message, and for correcting/editing or rewriting the information.

4. A terminal according to claim 2, wherein said means for updating and changing the charge table contents comprises means for receiving information from means for receiving table information from a wire line interface such as an ISDN, public network, or PC network, and for correcting/editing or rewriting the information.

5. A terminal according to claim 2, wherein said means for updating and changing the charge table contents comprises means for receiving information from means for receiving table information from an IrDA optical communication interface, and correcting/editing or rewriting the information.

6. A terminal according to claim 2, wherein said means for updating and changing the charge table contents comprises means for receiving information from means for receiving table information upon key input operation by an operator, and for correcting/editing or rewriting the information.

7. A terminal according to claim 2, wherein said means for updating and changing the charge table contents comprises means constituted by a combination of a plurality of means for receiving information from means for receiving table information from a radio channel like message, and for correcting/editing or rewriting the information, said means for receiving information from a wire line interface such as an ISDN, public network, or PC network, and for correcting/editing or rewriting the information, said means for receiving information from means for receiving table information from an IrDA optical communication interface, and for correcting/editing or rewriting the information, and said means for receiving information from means for receiving table information upon key input operation by an operator, and for correcting/editing or rewriting the information.

* * * * *